United States Patent
Iida et al.

(10) Patent No.: US 10,479,103 B2
(45) Date of Patent: *Nov. 19, 2019

(54) AQUEOUS INK COMPOSITION AND INK JET RECORDING APPARATUS

(71) Applicant: Seiko Epson Corporation, Tokyo (JP)

(72) Inventors: Keiji Iida, Chikuhoku (JP); Tomohito Nakano, Shiojiri (JP); Keisuke Morita, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,372

(22) Filed: Mar. 8, 2018

(65) Prior Publication Data

US 2018/0273783 A1  Sep. 27, 2018

(30) Foreign Application Priority Data

Mar. 27, 2017 (JP) .................................. 2017-061647

(51) Int. Cl.
  *B41J 2/21* (2006.01)
  *B41J 2/01* (2006.01)
  (Continued)

(52) U.S. Cl.
  CPC .............. *B41J 2/2107* (2013.01); *B41J 2/01* (2013.01); *C09D 11/033* (2013.01);
  (Continued)

(58) Field of Classification Search
  CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00;
  (Continued)

(56) References Cited

U.S. PATENT DOCUMENTS 7,955,425 B2   6/2011  Koganehira et al.
8,435,339 B2   5/2013  Koyano et al.
(Continued)

FOREIGN PATENT DOCUMENTS

EP   2 657 306 A1   10/2013
JP   2010-270225 A  12/2010
(Continued)

OTHER PUBLICATIONS

Extended European Search Report for Patent Application No. EP 18 16 0577.5 dated Jun. 19, 2018 (5 pages).

*Primary Examiner* — Manish S Shah
(74) *Attorney, Agent, or Firm* — Harness, Dickey & Pierce, P.L.C.

(57) ABSTRACT

An aqueous ink composition contains: an alkanediol having a normal boiling point of 240° C. or higher; polyoxyethylene mono(2-ethylhexyl) ether having a carbon number of 14 or more and 22 or less; and water, in which a content of the polyoxyethylene mono(2-ethylhexyl) ether having a carbon number of 14 or more and 22 or less is 0.4% by mass or lower based on the total amount of the aqueous ink composition.

18 Claims, 1 Drawing Sheet

(51) Int. Cl.
*C09D 11/30* (2014.01)
*C09D 11/102* (2014.01)
*C09D 11/033* (2014.01)
*C09D 11/322* (2014.01)
*C09D 11/38* (2014.01)

(52) U.S. Cl.
CPC ............ *C09D 11/102* (2013.01); *C09D 11/30* (2013.01); *C09D 11/322* (2013.01); *C09D 11/38* (2013.01)

(58) Field of Classification Search
CPC .... B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 8,992,675 B2 | 3/2015 | Komatsu | |
| 2004/0114013 A1* | 6/2004 | Doi | C09D 11/322 347/100 |
| 2009/0238974 A1 | 9/2009 | Kawabe et al. | |
| 2014/0022321 A1* | 1/2014 | Komatsu | B41J 2/01 347/100 |
| 2014/0292943 A1 | 10/2014 | Kagata et al. | |
| 2014/0295147 A1 | 10/2014 | Okuyama et al. | |
| 2015/0275014 A1* | 10/2015 | Yamazaki | C09D 11/033 347/20 |
| 2016/0016402 A1* | 1/2016 | Denda | B41J 2/21 347/15 |

FOREIGN PATENT DOCUMENTS

| | | |
|---|---|---|
| JP | 2013-180434 A | 9/2013 |
| JP | 2013-230638 A | 11/2013 |
| JP | 2014-108593 A | 6/2014 |
| JP | 2014-200917 A | 10/2014 |
| JP | 2015-199790 A | 11/2015 |

* cited by examiner

US 10,479,103 B2

AQUEOUS INK COMPOSITION AND INK JET RECORDING APPARATUS

BACKGROUND

1. Technical Field

The present invention relates to an aqueous ink composition and an ink jet recording apparatus.

2. Related Art

An ink jet recording method enables recording of high-resolution images by using a relatively simple apparatus and thus has been developing rapidly in various fields. In such circumstances, various approaches to challenges, such as discharge stability, have been investigated. For the purpose of providing an ink jet ink that has excellent storage stability, suppressed adhesion to a nozzle face of a recording head, and good dischargeability even when recording is resumed after a certain period of time, JP-A-2015-199790, for example, discloses an ink jet ink containing resin particles, a pigment, and a water-soluble organic solvent. The resin particles each include a first layer that has a tetrahydrofuran-insoluble fraction of more than 25% by mass and that is formed of a first resin having an ionic group. The water-soluble organic solvent is 1,2-hexanediol.

As in JP-A-2015-199790, 1,2-hexanediol has been widely used as a solvent for ink compositions. This is because, in addition to enhancing wettability of ink compositions and improving granularity of images to be obtained, 1,2-hexanediol also serves to dissolve extraneous material, such as salts which may be generated in ink compositions, and thus can contribute to improvements in storage stability and/or discharge stability of ink compositions. There is, however, a problem in which 1,2-hexanediol has a low boiling point and thus readily evaporates. In recent years, ink compositions with low emission of volatile organic compounds (VOC) have been desired in order to meet environmental regulatory standards as an environmental initiative. Accordingly, it is desirable to improve the granularity of images to be obtained and achieve excellent storage stability and low VOC emission without using 1,2-hexanediol.

SUMMARY

An advantage of some aspects of the invention is to provide an aqueous ink composition that has excellent storage stability, improved granularity of images to be obtained, and low VOC emission, thereby more readily meeting environmental regulatory standards as an environmental initiative.

The present inventors have intensively studied to achieve the above-mentioned advantage and consequently found that the advantage can be achieved by using a specific alkanediol and polyoxyethylene mono(2-ethylhexyl) ether, thereby completed the invention.

An aqueous ink composition according to an aspect of the invention contains: an alkanediol having a normal boiling point of 240° C. or higher; polyoxyethylene mono(2-ethylhexyl) ether having a carbon number of 14 or more and or less; and water, in which a content of the polyoxyethylene mono(2-ethylhexyl) ether having a carbon number of 14 or more and 22 or less is 0.4% by mass or lower based on a total amount of the aqueous ink composition. Preferably, the aqueous ink composition further contains a calcium ion, and/or diethylene glycol mono(2-ethylhexyl) ether. Preferably, a content of the alkanediol having a normal boiling point of 240° C. or higher is 3% by mass or higher and 15% by mass or lower based on the total amount of the aqueous ink composition, and/or a content of the diethylene glycol mono(2-ethylhexyl) ether is 0.1% by mass or higher and 0.5% by mass or lower based on the total amount of the aqueous ink composition. Preferably, the aqueous ink composition does not contain more than 0.5% by mass of an organic solvent having a normal boiling point of lower than 240° C., based on the total amount of the aqueous ink composition. Preferably, a carbon number of the alkanediol is 8 or less, and/or a carbon number of the polyoxyethylene mono(2-ethylhexyl) ether is 16 or more and 20 or less. An ink jet recording apparatus according to a second aspect of the invention includes a head that discharges the aqueous ink composition.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
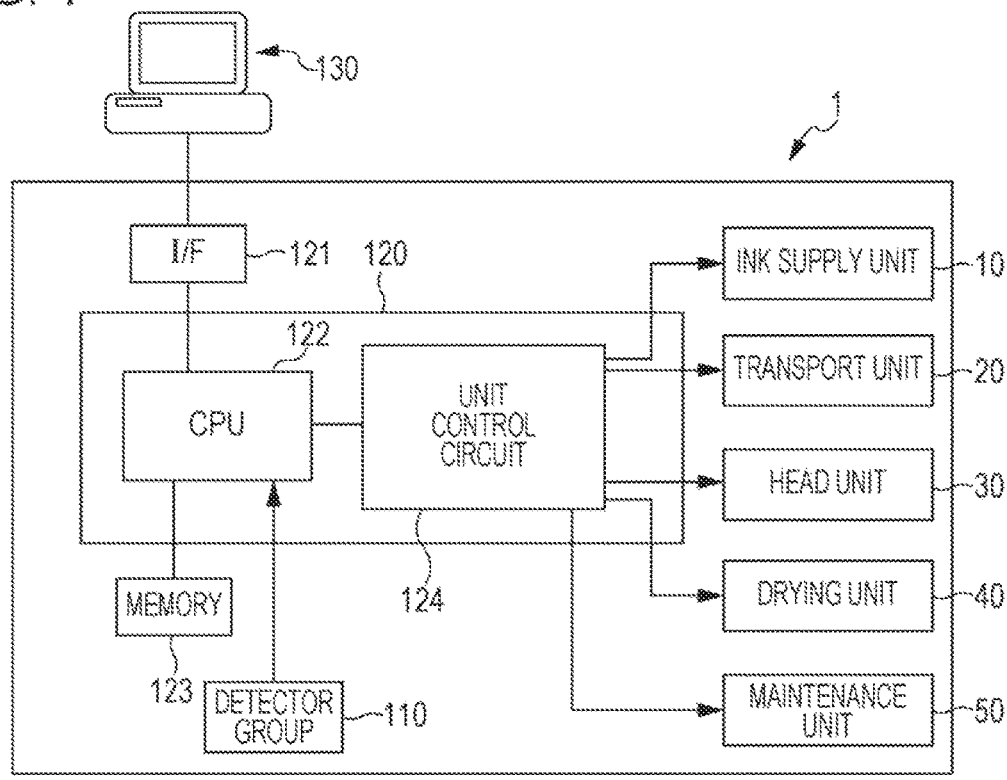
FIG. 1 is a block diagram illustrating an example configuration of a recording apparatus that can be used in an embodiment of the invention.

Hereinafter, an embodiment of the invention (hereinafter referred to as "the embodiment") will be described in detail. The invention, however, is not limited to the embodiment, and various modifications are possible without departing from the spirit of the invention.

Aqueous Ink Composition

An aqueous ink composition of the embodiment contains: an alkanediol having a normal boiling point of 240° C. or higher; polyoxyethylene mono(2-ethylhexyl) ether having a carbon number of 14 or more and 22 or less; and water, in which the content of the polyoxyethylene mono(2-ethylhexyl) ether having a carbon number of 14 or more and 22 or less is 0.4% by mass or lower based on a total amount of the aqueous ink composition.

In order to achieve low VOC emission, the aqueous ink composition of the embodiment contains an alkanediol having a normal boiling point of 240° C. or higher instead of a conventionally used alkanediol having a normal boiling point of lower than 240° C. Meanwhile, dynamic surface tension, which rises when an alkanediol having a normal boiling point of 240° C. or higher is used, is adjusted by incorporating polyoxyethylene mono(2-ethylhexyl) ether having a carbon number of 14 or more and 22 or less. Further, the studies by the present inventors revealed that extraneous material is generated when an alkanediol having a normal boiling point of lower than 240° C. is not used. Although the specific cause has not yet been identified, it is believed that the material that can be dissolved by an alkanediol having a normal boiling point of lower than 240° C. would precipitate as an extraneous material when such an alkanediol having a normal boiling point of lower than 240° C. is not used. In the embodiment, polyoxyethylene mono (2-ethylhexyl) ether having a carbon number of 14 or more and 22 or less dissolves the extraneous material and suppresses generation of such extraneous material even when an alkanediol having a normal boiling point of lower than 240°

C. is not used. Such extraneous material is believed to originate from sparingly soluble salts that are formed from metal components, such as calcium, contained in pigments as unavoidable impurities and from stearic acid that is contained in ink containers and/or packs as an unavoidable plasticizer and migrates into ink.

Alkanediol Having Normal Boiling Point of 240° C. or Higher

An alkanediol with a normal boiling point of 240° C. or higher has a carbon number of, but are not specifically limited to, preferably 8 or less, more preferably 7 or less, and further preferably 6 or less. By setting the carbon number of the alkanediol having a normal boiling point of 240° C. or higher to within the above range, storage stability tends to be further enhanced. Examples of the alkanediol include 1,5-pentanediol [242° C.], 1,6-hexanediol [250° C.], 3-methyl-1,5-pentanediol [250° C.], and 2-ethyl-1,3-hexanediol [244° C.]. Among these alkanediols, 3-methyl-1,5-pentanediol is preferable.

The content of the alkanediol having a normal boiling point of 240° C. or higher is preferably 3% by mass or higher and 15% by mass or lower, more preferably 5% by mass or higher and 15% by mass or lower, and further preferably 7.5% by mass or higher and 12.5% by mass or lower, based on the total amount of an aqueous ink composition. By setting the content of the alkanediol having a normal boiling point of 240° C. or higher to 3% by mass or higher, granularity as a measure of obtained image quality tends to be further improved. Also, by setting the content of the alkanediol having a normal boiling point of 240° C. or higher to 15% by mass or lower, discharge stability tends to be further enhanced.

Polyoxyethylene Mono(2-Ethylhexyl) Ether Having Carbon Number of 14 or More and 22 or Less Examples of polyoxyethylene mono(2-ethylhexyl) ether having a carbon number of 14 or more and 22 or less include, but are not specifically limited to, trioxyethylene mono(2-ethylhexyl) ether, tetraoxyethylene mono(2-ethylhexyl) ether, pentaoxyethylene mono(2-ethylhexyl) ether, hexaoxyethylene mono(2-ethylhexyl) ether, heptaoxyethylene mono(2-ethylhexyl) ether, octaoxyethylene mono(2-ethylhexyl) ether, nonaoxyethylene mono(2-ethylhexyl) ether, decaoxyethylene mono(2-ethylhexyl) ether, undecaoxyethylene mono(2-ethylhexyl) ether, dodecaoxyethylene mono(2-ethylhexyl) ether, tridecaoxyethylene mono(2-ethylhexyl) ether, tetradecaoxyethylene mono(2-ethylhexyl) ether, pentadecaoxyethylene mono(2-ethylhexyl) ether, hexadecaoxyethylene mono(2-ethylhexyl) ether, heptadecaoxyethylene mono(2-ethylhexyl) ether, octadecaoxyethylene mono(2-ethylhexyl) ether, and nonadecaoxyethylene mono(2-ethylhexyl) ether.

The carbon number of the above-mentioned polyoxyethylene mono(2-ethylhexyl) ether is 14 or more and 22 or less, preferably 16 or more and 20 or less, and more preferably 18 or more and 20 or less. By setting the carbon number of the polyoxyethylene mono(2-ethylhexyl) ether to within the above range, storage stability tends to be further enhanced.

The hydrophile-lipophile balance (HLB) of the polyoxyethylene mono(2-ethylhexyl) ether having a carbon number of 14 or more and 22 or less is preferably 10 or higher and 14.5 or lower, more preferably 10.5 or higher and 14.3 or lower, and further preferably 11 or higher and 14 or lower.

The content of the polyoxyethylene mono(2-ethylhexyl) ether having a carbon number of 14 or more and 22 or less is 0.4% by mass or lower, preferably 0.3% by mass or lower, and more preferably 0.2% by mass or lower, based on the total amount of an aqueous ink composition. Also, the content of the polyoxyethylene mono(2-ethylhexyl) ether having a carbon number of 14 or more and 22 or less is preferably 0.01% by mass or higher, more preferably 0.05% by mass or higher, and further preferably 0.1% by mass or higher, based on the total amount of an aqueous ink composition. By setting the content of the polyoxyethylene mono(2-ethylhexyl) ether having a carbon number of 14 or more and 22 or less to 0.4% by mass or lower, discharge stability is further enhanced. Also, by setting the content of the polyoxyethylene mono(2-ethylhexyl) ether having a carbon number of 14 or more and 22 or less to 0.01% by mass or higher, storage stability tends to be further enhanced.

Polyoxyethylene Mono(2-Ethylhexyl) Ether Having Carbon Number of 13 or Less

The aqueous ink composition of the embodiment may contain polyoxyethylene mono(2-ethylhexyl) ether having a carbon number of 13 or less. Examples of the polyoxyethylene mono(2-ethylhexyl) ether having a carbon number of 13 or less include, but are not specifically limited to, ethylene glycol mono(2-ethylhexyl) ether and diethylene glycol mono(2-ethylhexyl) ether. Among the examples, diethylene glycol mono(2-ethylhexyl) ether is preferable. By incorporating diethylene glycol mono(2-ethylhexyl) ether, granularity as a measure of obtained image quality tends to be further improved while storage stability tends to be further enhanced.

The content of the polyethylene glycol mono(2-ethylhexyl) ether having a carbon number of 13 or less is preferably 0.01% by mass or higher and 0.5% by mass or lower, more preferably 0.1% by mass or higher and 0.5% by mass or lower, and further preferably 0.2% by mass or higher and 0.4% by mass or lower. By setting the content of the polyethylene glycol mono(2-ethylhexyl) ether having a carbon number of 13 or less to 0.01% by mass or higher, granularity as a measure of obtained image quality tends to be further improved. Also, by setting the content of the polyethylene glycol mono(2-ethylhexyl) ether having a carbon number of 13 or less to 0.5% by mass or lower, storage stability tends to be further enhanced.

Water

Examples of water include pure water, such as deionized water, ultrafiltration-treated water, reverse osmosis-treated water, and distilled water; and water from which ionic impurities have been removed as much as possible, such as ultrapure water.

The content of water is preferably 50 to 80% by mass, more preferably 55 to 75% by mass, and further preferably 60 to 70% by mass, based on the total amount of an aqueous ink composition.

Organic Solvent Having Normal Boiling Point of Lower than 240° C.

The aqueous ink composition of the embodiment may contain an organic solvent having a normal boiling point of lower than 240° C. in addition to the above-mentioned alkanediol and polyoxyethylene mono(2-ethylhexyl) ether. Examples of the organic solvent having a normal boiling point of lower than 240° C. include, but are not specifically limited to, 1,2-hexanediol.

The content of the organic solvent having a normal boiling point of lower than 240° C. is preferably 0.5% by mass or lower, more preferably 0.3% by mass or lower, further preferably 0.1% by mass or lower, based on the total amount of an aqueous ink composition, and particularly preferably a detection limit or lower. By setting the content of the organic solvent having a normal boiling point of lower than 240° C. to within the above range, VOC emission is further lowered, and thus meeting environmental regulatory standards as an environmental initiative can be achieved more readily.

Organic Solvent Having Normal Boiling Point of 240° C. or Higher

The aqueous ink composition of the embodiment may contain an organic solvent having a normal boiling point of 240° C. or higher in addition to the above-mentioned alkanediol and polyoxyethylene mono(2-ethylhexyl) ether. Examples of the organic solvent having a normal boiling point of 240° C. or higher include, but are not specifically limited to, glycerin, diethylene glycol, triethylene glycol, triethylene glycol monobutyl ether, and 2-ethyl-1,3-hexanediol.

The content of the organic solvent having a normal boiling point of 240° C. or higher is preferably 5% by mass or higher and 20% by mass or lower, more preferably 7.5% by mass or higher and 17.5% by mass or lower, and further preferably 10% by mass or higher and 15% by mass or lower, based on the total amount of an aqueous ink composition. Since the organic solvent having a normal boiling point of 240° C. or higher exhibits low VOC emission, meeting environmental regulatory standards as an environmental initiative can be achieved more readily.

Calcium Ions

The aqueous ink composition of the embodiment may unavoidably contain calcium ions. Calcium ions may be present in the form of salts with other components. Calcium ions may be contained in an ink composition as an impurity originating primarily from a pigment. As a result of the contained calcium ions, storage stability is lowered since a sparingly soluble salt is readily formed. The aqueous ink composition of the embodiment, however, can dissolve extraneous material by incorporating polyoxyethylene mono (2-ethylhexyl ether) having a carbon number of 14 or more and 22 or less.

The content of calcium ions is preferably 1 ppm or higher and 80 ppm or lower, more preferably 10 ppm or higher and 70 ppm or lower, and further preferably 20 ppm or higher and 60 ppm or lower, based on the total amount of an aqueous ink composition. By setting the content of calcium ions to ppm or lower, storage stability tends to be further enhanced. Meanwhile, an aqueous ink composition may unavoidably contain calcium ions as impurities of various components. The content of calcium ions can be determined by the method described in the Examples section. The content of calcium ions can be lowered by purifying each component of an aqueous ink composition.

Pigment

The aqueous ink composition of the embodiment may further contain a pigment. Examples of the pigment include, but are not specifically limited to, an inorganic pigment and an organic pigment. The pigment may be used alone or in combination.

Examples of the inorganic pigment include, but are not specifically limited to, carbon black (C.I. Pigment Black 7), such as furnace black, lamp black, acetylene black, or channel black; iron oxide; and titanium oxide.

Examples of the organic pigment include, but are not specifically limited to, quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

The content of the pigment is preferably 1% by mass or higher and 10% by mass or lower, more preferably 2.5% by mass or higher and 7.5% by mass or lower, and further preferably 3% by mass or higher and 7% by mass or lower, based on the total amount of an aqueous ink composition.

Resin Emulsion

The aqueous ink composition of the embodiment may further contain a resin emulsion. Examples of the resin emulsion include, but are not specifically limited to, homopolymers or copolymers of (meth)acrylic acid, a (meth)acrylic ester, acrylonitrile, a cyanoacrylate, acrylamide, an olefin, styrene, vinyl acetate, vinyl chloride, vinyl alcohol, a vinyl ether, vinylpyrrolidone, vinylcarbazole, vinylimidazole, and/or vinylidene chloride; a fluororesin; and a natural resin.

The content of the resin emulsion is preferably 1% by mass or higher and 10% by mass or lower, more preferably 3% by mass or higher and 7.5% by mass or lower, and further preferably 3% by mass or higher and 5% by mass or lower, based on the total amount of an aqueous ink composition.

Surfactant

The aqueous ink composition of the embodiment may further contain a surfactant. Examples of the surfactant include, but are not specifically limited to, acetylenic glycol surfactants, fluoro surfactants, and silicone surfactants.

The acetylenic glycol surfactants are preferably, but are not specifically limited to, one or more surfactants selected from 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4-dimethyl-5-decyne-4-ol. Examples of commercially available acetylenic glycol surfactants include, but are not specifically limited to, Olfine 104 series and Olfine E series, such as Olfine E1010, (trade names from Air Products Japan, Inc.); and Surfynol 465 and Surfynol 61 (trade names from Nissin Chemical Industry Co. Ltd.). The acetylenic glycol surfactants may be used alone or in combination.

Examples of the fluoro surfactants include, but are not specifically limited to, perfluoroalkylsulfonate salts, perfluoroalkylcarboxylate salts, perfluoroalkylphosphate esters, polyethylene oxide perfluoroalkyl ether, perfluoroalkylbetaines, and perfluoroalkylamine oxide compounds. Examples of commercially available fluoro surfactants include, but are not specifically limited to, 5-144, S-145 (from Asahi Glass Co., Ltd.); FC-170C, FC-430, Fluorad FC4430 (from Sumitomo 3M Limited); FSO, FSO-100, FSN, FSN-100, FS-300 (from DuPont); and FT-250 and 251 (from NEOS Company Limited). The fluoro surfactants may be used alone or in combination.

Examples of the silicone surfactants include polysiloxane compounds and polyether-modified organosiloxanes. Examples of commercially available silicone surfactants include, but are not specifically limited to, BYK-306, BYK-307, BYK-333, BYK-341, BYK-345, BYK-346, BYK-347, BYK-348, BYK-349 (trade names from BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names from Shin-Etsu Chemical Co., Ltd.).

The content of the surfactant is preferably 0.1 to 5% by mass, and more preferably 0.1 to 3% by mass, based on the total amount of an aqueous ink composition.

Recording Method

The recording method of the embodiment is not specifically limited provided that the method includes a discharge step in which the above-described aqueous ink composition is discharged so as to be attached to a recording medium. When an aqueous ink composition is discharged in an ink jet mode, a commonly known ink jet recording apparatus can be used. A piezo mode or a mode in which ink is discharged by bubbles generated during heating of ink, for example, can be employed as a discharge method.

Recording Medium

Recorded articles are obtained by an ink jet recording method described hereinafter, i.e., by discharging ink compositions onto recording media, for example. Examples of such recording media include absorbent and non-absorbent recording media. An ink jet recording method described hereinafter is widely applicable to recording media having various absorption capabilities, from non-absorbent recording media, which are difficult for aqueous ink compositions to permeate, to absorbent recording media, through which ink compositions readily permeate. When the ink composition of the invention is applied to a non-absorbent recording medium, however, a drying process, for example, is needed in some cases after curing by UV irradiation.

Examples of the absorbent recording media include, but are not specifically limited to, plain paper, such as electrophotographic paper with high ink permeability; ink jet paper that has an ink absorption layer formed of silica particles and/or alumina particles, or an ink absorption layer formed of a hydrophilic polymer, such as polyvinyl alcohol (PVA) or polyvinylpyrrolidone (PVP); and art paper, coated paper, and cast paper, for example, which have relatively low ink permeability and are used for common offset printing.

Examples of the non-absorbent recording media include, but are not specifically limited to, films or plates of plastic, such as polyvinyl chloride, polyethylene, polypropylene, polyethylene terephthalate (PET), a polycarbonate, polystyrene, or a polyurethane; plates of metal, such as iron, silver, copper, or aluminum; metal plates, plastic films, and alloy plates, such as stainless steel or brass, which are manufactured by vapor-depositing the above metal; and recording media in which paper substrates are bonded (coated) with films of plastic, such as polyvinyl chloride, polyethylene, polypropylene, polyethylene terephthalate (PET), a polycarbonate, polystyrene, or a polyurethane.

Ink Jet Recording Apparatus

An ink jet recording apparatus using the aqueous ink composition of the embodiment will be described. FIG. 1 is a block diagram illustrating an example configuration of a recording apparatus that can be used in the embodiment. A computer 130, on which a printer driver is installed, outputs print data corresponding to images to a printer 1 so as to cause the printer 1 to record the images. The printer corresponds to a "recording apparatus". The printer 1 includes an ink supply unit 10, a transport unit 20, a head unit 30, a drying unit 40, a maintenance unit 50, a detector group 110, a memory 123, an interface 121, and a controller 120. The controller 120 includes a CPU 122 and a unit control circuit 124. When the printer 1 receives print data from the computer 130, which is an external apparatus, the printer 1 causes the controller 120 to control each unit, thereby controlling various recording conditions, and records images on recording media in accordance with the print data. The status of the printer 1 is monitored by the detector group 110, and the detector group 110 outputs the detection results to the controller 120. The controller 120 controls each unit on the basis of the detection results output from the detector group 110, and stores, in the memory 123, the print data that is input via the interface 121. The memory 123 also stores control information for controlling each unit. The drying unit 40 includes a heater and an air blower, for example, and dries compositions, such as ink, attached to recording media.

Figure 2:
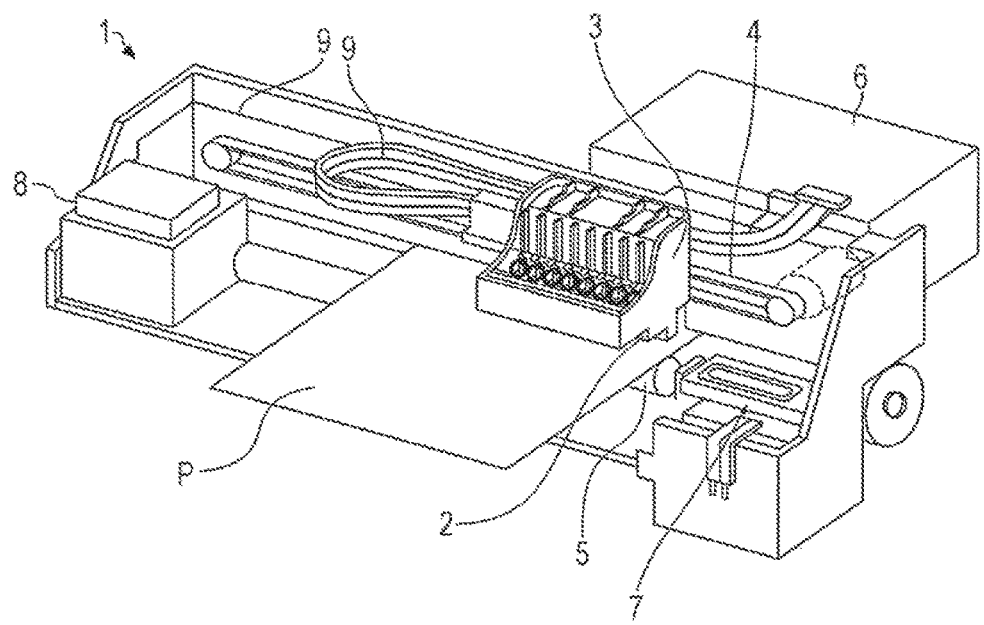
FIG. 2 is a perspective view illustrating a recording apparatus in an embodiment of the invention.

FIG. 2 is a perspective view illustrating a configuration of the recording apparatus (printer 1) in the embodiment. The printer 1 illustrated in FIG. 2 is a serial printer. A serial printer refers to a printer in which a head is mounted on a carriage that moves in a specific direction, and droplets are discharged onto recording media by the movement of the head accompanying the movement of the carriage.

As illustrated in FIG. 2, the printer 1 includes a carriage 3 in which a head 2 is mounted, a carriage moving mechanism 4 that moves the carriage 3 in the width direction of a recording medium P, and a medium feed mechanism 5 that transports the recording medium P in the feed direction. The printer 1 also includes a control section 6 that controls the whole operation of the printer 1. The width direction of a medium herein refers to a main scanning direction (a head scanning direction). The feed direction of a medium herein refers to a sub-scanning direction (a direction orthogonal to the main scanning direction).

As illustrated in FIG. 2, the head 2 is connected, via ink supply tubes 9 (ink channels), to an ink storage section 8 that individually stores recording ink and replacement ink. Each of the recording ink and replacement ink can be supplied to the head 2 by a switching unit.

The printer 1 according to the embodiment is illustrated as an off-carriage printer in which the ink storage section 8 is installed in a housing, for example, of the printer 1, and ink is supplied to the head 2 via the ink supply tubes 9. The printer 1, however, is not limited to the off-carriage printer. For example, an on-carriage printer in which ink cartridges are mounted on a carriage may also be employed. Further, a line head printer without a carriage may also be employed.

A home position, which represents a scanning starting point of the head 2, is set within the moving range of the head 2 outside a region where the recording medium P is transported. In the home position, a maintenance unit 7 including a cap member is provided.

The maintenance unit 7 is configured to perform a moistening operation, a flushing operation, and a head cleaning operation, for example. Specifically, the moistening operation refers to an operation that caps the head 2 with the cap member during the period excluding a recording operation and thus suppresses drying of nozzle holes (not illustrated) of the head 2. The flushing operation refers to an operation that prevents, for example, clogging of the nozzle holes by preliminarily discharging recording ink onto the cap member from the nozzle holes of the head 2. The head cleaning operation refers to an operation that replaces recording ink in the ink channel with replacement ink and vice versa while driving a suction pump (not illustrated) so as to eject ink from each nozzle hole after the head 2 is capped with the cap member.

Examples

Following, the invention will be further specifically described with Examples and Comparative Examples. The invention, however, is not limited to the following Examples in any way.

Materials for Ink Compositions

Main materials for ink compositions of Examples and Comparative Examples below are as follows.

Pigment

C.I. Pigment Blue 15:3

Organic Solvents
  Glycerin (normal boiling point 290° C., carbon number 3)
  Triethylene glycol (normal boiling point 287° C., carbon number 6)
Alkanediols
  3-Methyl-1,5-pentanediol (MPD) (normal boiling point 250° C., carbon number 6)
  1,2-Hexanediol (1,2-HD) (normal boiling point 223° C., carbon number 6)
  2-Ethyl-1,3-hexanediol (normal boiling point 244° C., carbon number 8)
Polyoxyethylene Mono(2-Ethylhexyl) Ether
  Diethylene glycol mono(2-ethylhexyl ether) (EHDG) (carbon number 12) (HLB 9.6)
  Newcol 1004 (from Nippon Nyukazai Co., Ltd.) (carbon number 16) (HLB 11.5)
  Newcol 1006 (from Nippon Nyukazai Co., Ltd.) (carbon number 20) (HLB 13.4)
  Newcol 1008 (from Nippon Nyukazai Co., Ltd.) (carbon number 24) (HLB 14.6)

Surfactant
  Silicone surfactant (BYK348)
Resin Emulsion
  Dynaflow K201 (from JSR Corporation, sulfonated isoprene-styrene copolymer resin emulsion)
Preparation of Ink Compositions
  Each ink composition was obtained by mixing respective materials according to the composition in Tables 1 and 2 below and stirring sufficiently. In Tables 1 and 2 below, a unit of the numerical values is % by mass and the total is 100.0% by mass.
Measuring Method for the Content of Calcium Ions
  Calcium ions were measured by ion chromatography for a measurement sample, which was prepared by ultracentrifuging an aqueous ink composition at 80,000 rpm for 1 hour, and then diluting the supernatant 1,000 times. The measurement conditions are as follows.
Measurement Conditions
  Apparatus: ion chromatograph (940 Professional IC, Metrohm AG)
  Column: cation column (Metrosep C4-150/4.0)
  Flow rate: 0.9 mL/min

TABLE 1

| | Boiling point (° C.) | Carbon number | EO chain | Examples | | | | | | | | | | | | |
|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 |
| Pigment (C.I. Pigment Blue 15:3) | — | — | | 5 | 5 | 5 | 5 | 5 | 5 | 5 | 5 | 5 | 5 | 5 | 5 | 5 |
| Glycerin | 290 | 3 | | 10 | 10 | 10 | 10 | 10 | 10 | 10 | 10 | 10 | 10 | 10 | 10 | 10 |
| Triethylene glycol | 287 | 6 | | 3 | 3 | 3 | 3 | 3 | 3 | 3 | 3 | 3 | 3 | 3 | 3 | 3 |
| Diethylene glycol mono (2-ethylhexyl ether) (EHDG) | 272 | 12 | 2 | 0.3 | 0.3 | 0.3 | 0.3 | 0.3 | 0.3 | 0.3 | 0.05 | 0.1 | 0.5 | 0.3 | 0.3 | 0.3 |
| 3-Methyl-1,5-pentanediol (MPD) | 250 | 6 | | 10 | 10 | 10 | 10 | 10 | 3 | 15 | 10 | 10 | 10 | 10 | 10 | — |
| 1,2-Hexanediol (1,2-HD) | 223 | 6 | | — | — | — | — | — | — | — | — | — | — | — | 0.5 | — |
| 2-Ethyl-1,3-hexanediol | 244 | 8 | | — | — | — | — | — | — | — | — | — | — | — | — | 10 |
| Newcol 1004 | — | 16 | 4 | — | — | — | — | — | — | — | — | — | — | 0.2 | — | — |
| Newcol 1006 | — | 20 | 6 | 0.2 | 0.05 | 0.1 | 0.3 | 0.4 | 0.2 | 0.2 | 0.2 | 0.2 | 0.2 | — | 0.2 | 0.2 |
| Newcol 1008 | — | 24 | 8 | — | — | — | — | — | — | — | — | — | — | — | — | — |
| Silicone surfactant (BYK348) | | | | 0.5 | 0.5 | 0.5 | 0.5 | 0.5 | 0.5 | 0.5 | 0.5 | 0.5 | 0.5 | 0.5 | 0.5 | 0.5 |
| Resin (Dynaflow K201) | | | | 4 | 4 | 4 | 4 | 4 | 4 | 4 | 4 | 4 | 4 | 4 | 4 | 4 |
| Water | | | | Balance | Balance | Balance | Balance | Balance | Balance | Balance | Balance | Balance | Balance | Balance | Balance | Balance |
| Amount of Ca ions (ppm) | | | | 40 | 40 | 40 | 40 | 40 | 40 | 40 | 40 | 40 | 40 | 40 | 40 | 40 |
| VOC | | | | A | A | A | A | A | A | A | A | A | A | A | B | A |
| Granularity | | | | A | A | A | A | A | B | A | B | B | A | A | A | A |
| Discharge stability | | | | A | A | A | A | B | A | B | A | A | A | A | A | A |
| Storage stability | | | | A | B | A | A | A | A | A | A | A | B | A | A | B |

TABLE 2

| | Boiling point (° C.) | Carbon number | EO chain | Comparative Examples | | | | | |
|---|---|---|---|---|---|---|---|---|---|
| | | | | 1 | 2 | 3 | 4 | 5 | 6 |
| Pigment (C.I. Pigment Blue 15:3) | — | — | | 5 | 5 | 5 | 5 | 5 | 5 |
| Glycerin | 290 | 3 | | 10 | 10 | 10 | 10 | 10 | 10 |
| Triethylene glycol | 287 | 6 | | 3 | 3 | 3 | 3 | 3 | 3 |
| Diethylene glycol mono (2-ethylhexyl ether) (EHDG) | 272 | 12 | 2 | 0.3 | 0.3 | 0.3 | 0.3 | 0.3 | 0.3 |
| 3-Methyl-1,5-pentanediol (MPD) | 250 | 6 | | 10 | 10 | 10 | — | — | — |
| 1,2-Hexanediol (1,2-HD) | 223 | 6 | | — | — | — | 10 | — | 10 |
| 2-Ethyl-1,3-hexanediol | 244 | 8 | | — | — | — | — | — | — |
| Newcol 1004 | — | 16 | 4 | — | | | | | |

TABLE 2-continued

|  | Boiling point (° C.) | Carbon number | EO chain | Comparative Examples | | | | | |
| --- | --- | --- | --- | --- | --- | --- | --- | --- | --- |
|  |  |  |  | 1 | 2 | 3 | 4 | 5 | 6 |
| Newcol 1006 | — | 20 | 6 | — | 0.5 | — | 0.2 | 0.2 | — |
| Newcol 1008 | — | 24 | 8 | 0.2 | — | — | — | — | — |
| Silicone surfactant (BYK348) |  |  |  | 0.5 | 0.5 | 0.5 | 0.5 | 0.5 | 0.5 |
| Resin (Dynaflow K201) |  |  |  | 4 | 4 | 4 | 4 | 4 | 4 |
| Water |  |  |  | Balance | Balance | Balance | Balance | Balance | Balance |
| Amount of Ca ions (ppm) |  |  |  | 40 | 40 | 40 | 40 | 40 | 40 |
| VOC |  |  |  | A | A | A | C | A | C |
| Granularity |  |  |  | A | A | A | A | C | A |
| Discharge stability |  |  |  | A | B | A | A | B | A |
| Storage stability |  |  |  | C | C | C | A | C | A |

VOC Emission

Recording was performed by a recording apparatus used for recording tests below, and VOC emission was measured during the recording according to the Eco Mark product category No. 155 certification criteria "Imaging equipment such as copiers, printers, etc. (Version 1.2)" by Japan Environment Association. VOC emission of each ink composition was evaluated on the basis of the following criteria. For the evaluation, ink compositions were separately prepared from each ink composition of Examples and Comparative Examples by only changing the pigment while maintaining the same composition excluding the pigment, and thus ink sets each composed of cyan, magenta, yellow, and black ink compositions were prepared. The evaluation was performed using the ink sets.

Evaluation Criteria

A: VOC emission of less than 18 mg/h

B: VOC emission of 18 mg/h or more and less than 55 mg/h

C: VOC emission of 55 mg/h or more

Evaluation of Granularity

Cartridges of an ink jet printer (from Seiko Epson Corp., EP-803A) were filled with aqueous ink compositions obtained as above, and printing was performed at a plurality of duties on ink jet recording media (KA450PSK glossy photo paper (from Seiko Epson Corp.), 60° gloss of 41).

Evaluation Criteria

A: No image roughness at a duty of 30%

B: Discernible image roughness at a duty of 30%, but no image roughness at a duty of 50%

C: Discernible image roughness at a duty of 50%

Discharge Stability

Cartridges of an ink jet printer (from Seiko Epson Corp., PX-B700) were filled with aqueous ink compositions obtained as above. After confirming that the ink compositions were discharged from a plurality of nozzles connected with the respective cartridges, test patterns were continuously printed on 30 layers of A4 sheets. After the printing of 30 sheets, the nozzle checks were performed, and discharge characteristics were evaluated on the basis of the criteria below.

Evaluation Criteria

A: No missing nozzle

B: Recovery of 1 to 5 missing nozzle(s) after a single cleaning operation

C: Recovery of 6 to 10 missing nozzles after two or more cleaning operations

Storage Stability

Aqueous ink compositions obtained as above were sealed in glass bottles, and stored in an oven at 70° C. for 6 days or stored at ambient temperature (25° C.) for 6 days. The aqueous ink compositions after the storage were visually observed, and storage stability was evaluated on the basis of the criteria below.

Evaluation Criteria

A: No separation after storage at 70° C.

B: No separation after storage at ambient temperature, but separation after storage at 70° C.

C: Separation after storage at ambient temperature

The entire disclosure of Japanese Patent Application No. 2017-061647, filed Mar. 27, 2017 is expressly incorporated by reference herein.

What is claimed is:

1. An aqueous ink composition comprising:
    an alkanediol having a normal boiling point of 240° C. or higher;
    polyoxyethylene mono(2-ethylhexyl) ether having a carbon number of 14 or more and 22 or less; and
    water, wherein
    a content of the polyoxyethylene mono(2-ethylhexyl) ether having a carbon number of 14 or more and 22 or less is in a range of 0.01% to 0.4% by mass based on a total amount of the aqueous ink composition.

2. The aqueous ink composition according to claim 1, further comprising a calcium ion.

3. The aqueous ink composition according to claim 1, further comprising diethylene glycol mono(2-ethylhexyl) ether.

4. The aqueous ink composition according to claim 1, wherein
    a content of the alkanediol having a normal boiling point of 240° C. or higher is 3% by mass or higher and 15% by mass or lower based on the total amount of the aqueous ink composition.

5. The aqueous ink composition according to claim 3, wherein
    a content of the diethylene glycol mono(2-ethylhexyl) ether is 0.1% by mass or higher and 0.5% by mass or lower based on the total amount of the aqueous ink composition.

6. The aqueous ink composition according to claim 1, wherein
    the aqueous ink composition does not contain more than 0.5% by mass of an organic solvent having a normal boiling point of lower than 240° C., based on the total amount of the aqueous ink composition.

7. The aqueous ink composition according to claim 1, wherein
    a carbon number of the alkanediol is 8 or less.

8. The aqueous ink composition according to claim 1, wherein
the carbon number of the polyoxyethylene mono(2-ethylhexyl) ether is 16 or more and 20 or less.

9. An ink jet recording apparatus comprising a head that discharges the aqueous ink composition according to claim 1.

10. An ink jet recording apparatus comprising a head that discharges the aqueous ink composition according to claim 2.

11. An ink jet recording apparatus comprising a head that discharges the aqueous ink composition according to claim 3.

12. An ink jet recording apparatus comprising a head that discharges the aqueous ink composition according to claim 4.

13. An ink jet recording apparatus comprising a head that discharges the aqueous ink composition according to claim 5.

14. An ink jet recording apparatus comprising a head that discharges the aqueous ink composition according to claim 6.

15. An ink jet recording apparatus comprising a head that discharges the aqueous ink composition according to claim 7.

16. An ink jet recording apparatus comprising a head that discharges the aqueous ink composition according to claim 8.

17. The aqueous ink composition according to claim 2, wherein an amount of the calcium ion is in a range of 1-80 ppm.

18. The aqueous ink composition according to claim 1, wherein the aqueous ink composition does not contain an organic solvent having a normal boiling point that is less than 240° C.

* * * * *